No. 756,233. PATENTED APR. 5, 1904.
W. E. HEATH.
SEALING DEVICE.
APPLICATION FILED APR. 18, 1902. RENEWED SEPT. 14, 1903.
NO MODEL. 2 SHEETS—SHEET 1.

Witnesses
Geo. E. Frech.
E. R. Peck.

Inventor
William E. Heath.
By Hubert E. Peck
Attorney

No. 756,233. PATENTED APR. 5, 1904.
W. E. HEATH.
SEALING DEVICE.
APPLICATION FILED APR. 18, 1902. RENEWED SEPT. 14, 1903.
NO MODEL. 2 SHEETS—SHEET 2.
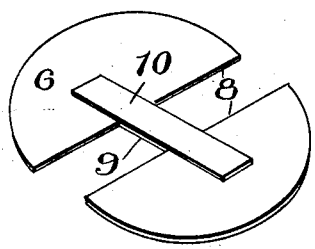
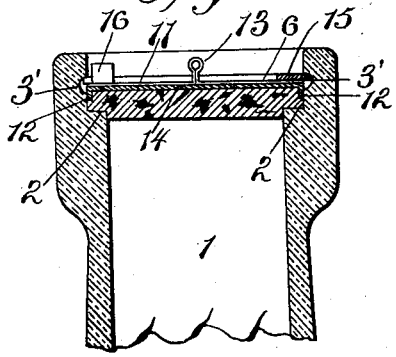
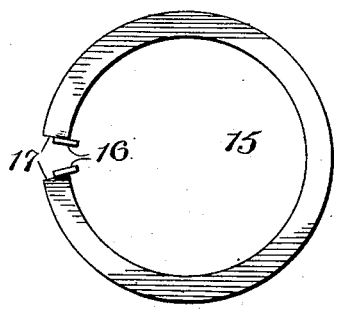
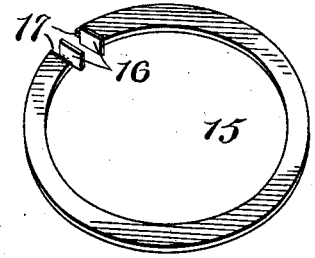
Witnesses
Geo. E. Fuch
E. R. Peck
Inventor
William E. Heath
By
Hubert D. Peck
Attorney No. 756,233.  
Patented April 5, 1904.

UNITED STATES PATENT OFFICE.

WILLIAM E. HEATH, OF BALTIMORE, MARYLAND, ASSIGNOR TO THE STANDARD BOTTLE-CAP CORPORATION, OF WILMINGTON, DELAWARE, A CORPORATION OF DELAWARE.

SEALING DEVICE.

SPECIFICATION forming part of Letters Patent No. 756,233, dated April 5, 1904.

Application filed April 18, 1902. Renewed September 14, 1903. Serial No. 173,191. (No model.)

*To all whom it may concern:*

Be it known that I, WILLIAM E. HEATH, a citizen of the United States, residing at Baltimore city, State of Maryland, have invented certain new and useful Improvements in Sealing Devices; and I do hereby declare the following to be a full, clear, and exact description of the invention, such as will enable others skilled in the art to which it appertains to make and use the same.

This invention relates to certain improvements in sealing devices for bottles, jars, and other receptacles, and more particularly to sealing devices peculiarly applicable to jars or other large-mouth bottles or receptacles.

An object of the invention is to provide a sealing disk or cap provided with improved and exceedingly simple and effective means—such as a tab, finger-hold, or the like—whereby the disk can be most readily and easily removed from the bottle-mouth by the fingers without the necessity of employing implements or sharp puncturing articles.

Another object of the invention is to provide an improved sealing device employing a sealing-disk and a separate improved readily-removable split spring-retainer ring to hold the disk down to its seat and in proper place maintaining the seal.

The invention consists in certain novel features in construction, in combinations of parts, or in arrangements of parts and details, as more fully and particularly pointed out and specified hereinafter.

Figure 1:
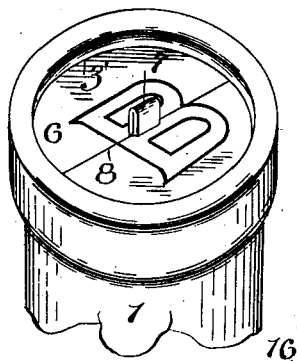
Figure 2:
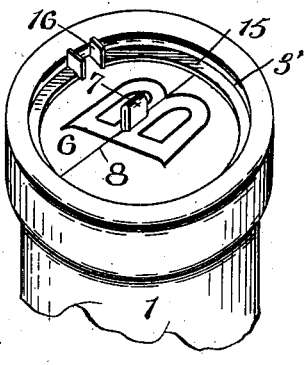
Figure 3:
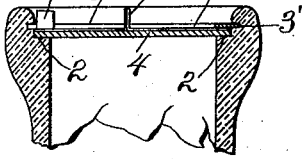
Figure 4:
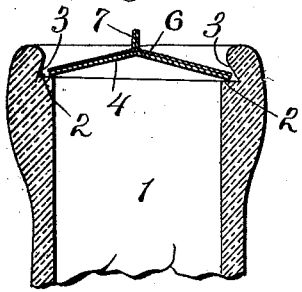
Figure 5:
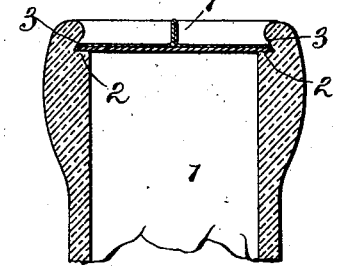
Figure 6:
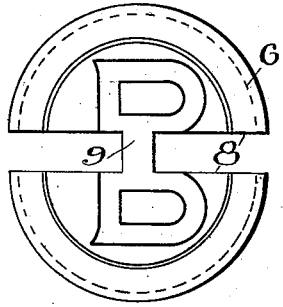
Figure 7:
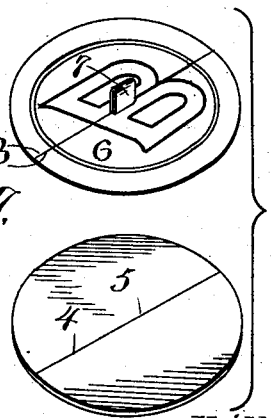

Referring to the examples shown in the accompanying drawings, Figure 1 is a perspective view of the mouth portion of a jar or bottle sealed by a sealing-disk in accordance with my invention, the spring-retainer not being shown. Fig. 2 is a perspective view similar to Fig. 1, showing the spring-retainer expanded in the bottle above and resting on the disk. Fig. 3 is a vertical section through the jar-mouth portion, disk, and retainer of Fig. 2. Fig. 4 is a vertical section through the jar-mouth portion and disk of Fig. 1, the disk being shown bent or doubled and in a position it can assume in being pulled from the jar-mouth or in a position to which the disk can be bent for insertion in the jar-mouth and under the locking-shoulder thereof. Fig. 5 is a vertical section through the jar-mouth portion and disk of Fig. 1, the disk shown in its locked position as it also appears in Fig. 1. Fig. 6 is a plan of a blank cut out from sheet material and from which the facing of the various disks or plugs shown can be bent or folded. Fig. 7 is a detail perspective of a disk and its facing-sheet, the facing-sheet being separated therefrom, the disk shown with a diametrical scored or fold line. Fig. 8 is a detail detached perspective of the facing-blank, showing the bridge-piece, which doubles up to form the tab, reinforced on its under surface. Fig. 9 is a vertical section through a jar-mouth, showing a sealing-disk held compressed therein by a retainer-ring cut or stamped up from thin spring sheet metal, the sealing-disk having the facing formed of thin sheet metal flanged or in the form of a cap, the tab or finger-hold thereof being slightly spread. Fig. 10 is a top plan of the sheet-metal retainer-ring of Figs. 2, 3, 9, and 11. Fig. 11 is a detail perspective of the retainer of Fig. 10.

In the drawings, 1 is the neck portion of a jar or bottle in its mouth having the annular sealing-shoulder 2 and the downwardly-facing annular locking-shoulder 3 above the sealing-shoulder and formed by tapering or enlarging the surrounding wall of the jar-mouth above and down to the sealing-shoulder. A removable sealing-disk is provided to close the jar-mouth and press down on and form the seal with said sealing-shoulder. This disk can be formed of any suitable elastic or somewhat flexible material and a top facing therefor. In certain figures of the drawings I show the disk 4 formed of comparatively heavy cardboard, paper, or the equivalent and somewhat flexible or elastic, so that by reason of its elasticity it can be forced into the jar-mouth and onto the sealing-seat or shoulder 2 to retain its position thereon, sealing the bottle and being held in position by the locking-shoulder 3. If desired, said disk can be formed with a diametrical line 5 of scoring or line of weakness, so that the disk will bend or give along said line, as indicated in Fig. 4, when the necessary pulling force is applied thereto in removing the disk. Said disk can also bend or yield along said line when being inserted in the jar-mouth, so that when flattened out on the sealing-seat the surrounding edge of the disk will project under the annular locking-shoulder, and the disk can be held thereby flat down on the sealing-shoulder.

6 is a facing-sheet cemented or otherwise secured on and preferably covering the top face of the disk and having a centrally-located tab or finger-hold 7 formed integral therewith. This facing can be formed of suitable sheet material, such as paper, thin sheet metal, &c. The facing is usually cut in blanks, about as shown in Fig. 6, in the form of two halves or similar sectors or quadrants having straight parallel separated inner or adjoining edges 8, said sectors or halves being connected by and integral with a centrally-located bridge-piece or strip 9, which is twice as long as the tab 7 in the completed disk. The space between the two edges 8 of the blank is bridged by said strip 9. The blank is preferably so proportioned that when its two edges 8 are brought together the blank forms a circular disk of a size to substantially cover and face the top side of the sealing-disk, on which it is cemented or secured. The facing is usually so secured on the disk that the meeting edges 8 are parallel and coinciding with the fold or bending line 5, provided the disk is formed with such a line. When the two halves of the blank are brought together, the bridge or connecting-piece is centrally folded or doubled upwardly and outwardly to form the finger-hold or tab 7, approximately located at and projecting upwardly from the central portion of the sealing-disk. The two plies of the connecting-piece are usually cemented or otherwise secured together to form the tab 7 of several thicknesses of material. If desired, the facing-sheet can be reinforced on the under side by a sheet or fabric. For instance, in Fig. 8 I show a reinforcing-piece 10 of fabric or other sheet material cemented on the under side of the blank and along the connecting-piece 9, so that the completed tab will be four ply in thickness and of increased strength.

In Figs. 1, 4, and 5 the disks are shown composed of elastic or stiff cardboard or equivalent material with the facing and of a diameter slightly greater than the smallest diameter of the jar-mouth above the seat 2, so that the disk must be forced down to said seat or bent in order to be inserted, whereby on engaging the seat said disk will flatten out under the shoulder 3.

Where a sealing-disk as just described is to be used with a retainer, I usually form the disk of such diameter that it can drop or be passed easily in the jar-mouth onto said seat, and I form the jar-mouth usually with an annular groove to form locking-shoulder 3' and to receive the retainer. (See Figs. 2, 3, and 9.)

Usually where the retainer is employed I form the sealing-plug with a comparatively thick disk of compressible sealing material 14, such as cork or other equivalent and suitable material.

If desired, the facing-sheet can be struck up from sheet metal in substantially the form shown by the blank of Fig. 6, which is then contracted and, if desired, struck up with the depending flange. Fig. 9 shows the completed sheet-metal facing 11 with surrounding depending flange 12 to form a cap. The facing 11 has the tab 13 usually somewhat spread or rounded at its upper end to avoid fracturing the metal of the connecting-piece or bridge of the blank in forming the completed cap and tab. Dotted line, Fig. 6, shows the circle on which the flange can be turned down.

When the facing is in the form of a cap, I usually force the sealing-medium disk 14 into the cap—that is, compress the upper portion thereof in the depending flange 12, so that the said sealing-medium disk projects below the flange and is held by friction in the cap. However, the disk 14 can be otherwise secured to the metal facing or cap, as by the application of a suitable adhesive material, and the flange need not be provided.

In Figs. 2, 9, and 10 I show an expanding split retainer-ring 15 having comparatively wide flat upper and lower faces. This ring is formed from thin sheet metal and can be easily and rapidly cut by suitable dies. The two free and separated ends of the split ring are bent up from the plane of the ring to form the two upwardly-projecting separated finger holds or pieces 16, usually parallel with each other and located a comparatively short distance apart. The free ends of the ring can be slightly enlarged inwardly and bent up to form the finger-holds, thereby leaving the outer vertical edges of the finger-holds located a distance inwardly from the outer surrounding edge or circle of the ring, (see Fig. 10,) forming the notched or rabbeted portions 17 17. (See Figs. 10 and 11.) The outer edges of the ring can hence move under the locking-shoulder from end to end of the ring and without interference by the upturned finger-holds. The flat retainer-ring is contracted and placed on the top face of the sealing-disk and then released and allowed to expand under the locking-shoulder of the jar-mouth, thereby holding the sealing-disk down to the sealing-shoulder and maintaining the seal.

Where a very tight seal is desired, suitable means are provided to compress the sealing-disk with great force on the sealing-seat, and while the disk is thus held compressed the retainer is introduced and expanded under the locking-shoulder.

By means of the finger holds or pieces on both free ends of the ring the retainer can be easily contracted and released by the thumb and index-finger pressing said finger-holds together, and without removing the fingers the retainer can be held contracted and be readily lifted from the jar-mouth. The sealing-disk can then be easily lifted from the jar-mouth through the medium of the tab. The disk can afterward be used as a cover for the jar, and, if desired, the retainer can be used to hold the disk in place, as the fingers can be easily employed to contract the ring and again place it in position in the mouth of the previously-opened jar.

Material advantages are attained by employing the sheet-metal ring, as the ring has a wide flat bearing-surface on the sealing-disk and a thin edge to effectively extend under the locking-shoulder.

If desired, dies can be provided to cut out the blanks of Fig. 6 and also practically by the same operation contract the blank to form the completed facing with tab and depending flange, if desired.

Where the flexible or elastic sealing or closing disk is employed having the scored or weakened diametrical line, it should be noted that the pull-tab is arranged in the plane of said line and that hence upward pull on said tab will cause the disk to buckle or bulge upwardly along said line, and thereby easily and readily effect the release of the disk from the jar-mouth.

Various other forms of finger-holds can be employed with the sealing-disk described, or said disk can in some instances be employed without the retainer, and, furthermore, I do not wish to limit myself to the employment of the retainer of Figs. 2 and 9 in connection with the particular disks shown herein.

What I claim is—

1. The sealing device consisting of the imperforate flexible disk and the top facing-sheet formed of the two halves united by the central bridge-piece, the two halves secured on the disk, with their inner edges together and the bridge-piece doubled upwardly to form a central tab, whereby the disk is formed with the flat top surface and the central tab, substantially as described.

2. The sealing device consisting of the flexible imperforate disk and the flexible facing secured thereto, the facing formed of the two sections united by the central bridge-piece and provided with the reinforce-strip secured to the under face of the bridge-piece, said sections of the facing cemented to and completely covering the disk, the bridge-piece doubled up and forming a central tab or finger-hold, substantially as described.

3. The sealing device consisting of the imperforate disk formed with a diametrical weakened fold-line and the flexible facing-sheet cemented to and completely covering the top face of the disk, said sheet formed of the two half-circles connected by the central narrow bridge-piece, the half-circles having their meeting edges above and parallel with said fold-line of the disk, said bridge-piece doubled up to form a central finger-hold or tab, substantially as described.

4. A bottle having a sealing-seat and a locking-shoulder above the seat, in combination with a compressible sealing-plug adapted to rest on said seat, and the split spring-retainer ring adapted to rest on the plug and under the locking-shoulder, said ring formed of sheet metal with the wide face to rest on the plug, the flat ends of the ring being bent up to form the finger-holds, the ends of the ring being notched so that the outer edges of the finger-holds are located a distance within the circle of the outer edge of the ring, substantially as described.

In testimony whereof I affix my signature in presence of two witnesses.

WILLIAM E. HEATH.

Witnesses:
FRANK M. HILL,
JACOB HILLQUIT.